United States Patent Office 3,523,946
Patented Aug. 11, 1970

3,523,946
SUBSTITUTED TRIAZINES
William Roy Deem, Altrincham, England, assignor to Imperial Chemical Industries Limited, London, England, a corporation of Great Britain
No Drawing. Filed June 29, 1967, Ser. No. 649,837
Claims priority, application Great Britain, July 13, 1966, 31,413/66
Int. Cl. C07d 55/48
U.S. Cl. 260—248          5 Claims

ABSTRACT OF THE DISCLOSURE

Preparation of 2,4,6 - tris(pentafluoroethyl)-1,3,5-triazine and 2-pentafluoroethyl-4,6-difluoro-1,3,5-triazine by heating cyanuric fluoride with tetrafluoroethylene in acetonitrile or dimethylformamide or other polar, aprotic solvents at 50° C. to 150° C. and under pressures from atmospheric to 50 atmospheres, conveniently under autogenous pressure, in the presence of an alkali metal fluoride or tetraalkyl-ammonium fluoride; and preparation of 2,4,6-tris(heptafluoroisopropyl)-1,3,5-triazine in the same manner except that hexafluoropropene is used instead of tetrafluoroethylene. 2,4,6-tris(perfluoroalkyl)-1,3,5-triazines are readily hydrolysed to perfluoroalkyl carboxylic acids and are thus intermediates for the preparation of insecticides and rodenticides.

BACKGROUND OF THE INVENTION

Field of the invention

Fluorine chemistry based on reactions between perfluoroolefins and fluorotriazines.

Description of prior art

Tris(perfluoroalkyl)triazines are known compounds that have been made by trimerising perfluoroalkyl nitriles by heating them under pressure (W. L. Reilly, H. C. Brown, J. Org. Chem. 1957, 22, 698), and are intermediates for preparing perfluoroalkyl carboxylic acids and their esters (T. R. Norton, J. Am. Chem. Soc. 1950, 72, 3527). Perfluoroalkyl difluorotriazines appear to be novel compounds.

SUMMARY OF THE INVENTION

Replacement of fluorine atoms in 2,4,6-trifluoro-1,3,5-triazine (cyanuric fluoride) by perfluoroalkyl groups to give perfluoroalkyl - substituted 2,4,6-trifluoro-1,3,5-triazines by heating cyanuric fluoride with a perfluoroolefin in a polar, aprotic solvent at 50° C. to 150° C., preferably under autogenous pressure, in the presence of an alkali metal fluoride or tetraalkylammonium fluoride acting as an ionic catalyst.

This invention relates to a novel process for making substituted triazines, particularly trisperfluoroalkyl triazines and perfluoroalkyl fluorotriazines.

We have found that in the presence of ionic catalysts perfluoroolefins will undergo additive reactions with cyanuric fluoride (2,4,6-trifluoro-1,3,5-triazine) whereby one or more of the fluorine atoms attached to carbon atoms in the cyanuric fluoride are replaced by one or more molecules of perfluoroolefin and then link to the perfluoro alkenyl radical of the latter to convert it into a perfluoroalkyl radical. The course of these reactions can be illustrated by Equations I–III relating to tetrafluoroethylene as perfluoroolefin.

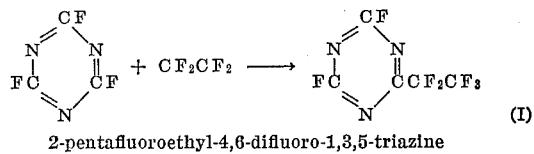
2-pentafluoroethyl-4,6-difluoro-1,3,5-triazine

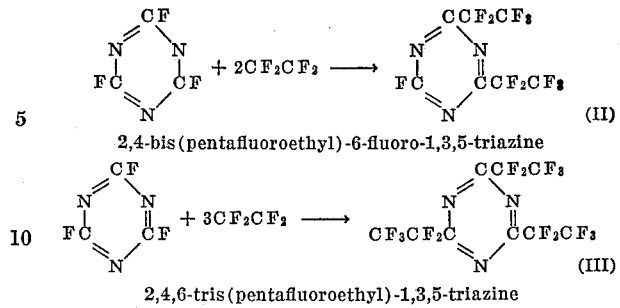
2,4-bis(pentafluoroethyl)-6-fluoro-1,3,5-triazine 2,4,6-tris(pentafluoroethyl)-1,3,5-triazine The invention thus provides a process for making tris-perfluoroalkyl triazines and perfluoroalkyl fluorotriazines comprising heating a perfluoroolefin with cyanuric fluoride in the presence of an ionic catalyst selected from fluorides of alkali metals and of tetraalkyl-ammonium radicals and in an aprotic solvent reaction medium.

Perfluoroolefins that can take part in the reactions include tetrafluoroethylene, hexafluoropropene, and the perfluorobutenes.

Suitable aprotic solvent reaction media include acetonitrile, dimethylformamide, tetramethylene sulphone, dimethyl sulphoxide, hexamethylene phosphoramide.

The reaction temperature is conveniently between 50° C. and 150° C. preferably from 80° C. to 130° C. Below about 80° C. the rate of reaction is slow whilst above about 150° C. side-reactions involving the solvent may occur. The reaction pressure may be from atmospheric pressure to 50 atmospheres. Below about 3 atmospheres the rate of reaction is slow and above 50 atmospheres little practical advantage is to be gained. The preferred pressure range is thus from 3 to 50 atmospheres. Pressures in this range can conveniently be achieved by carrying out the reaction in a sealed vessel under the autogeneous pressures realised in the reaction.

For the purpose of this invention an ionic catalyst is defined as a substance whose molecules contain cations and anions and dissolve in ionising solvents to yield cations and anions. They include salts of which fluorides of potassium and caesium and tetraethylammonium are particularly suitable.

Particularly favourable reaction conditions embrace acetonitrile as aprotic solvent reaction medium, caesium fluoride as ionic catalyst, a temperature of 80° C. to 100° C. and a reaction pressure of 30 to 40 atmospheres.

Perfluoroalkyl-substituted fluorotriazines are useful intermediates in the preparation of perfluoroalkyl carboxylic acids and their esters. For example 2,4,6-tris(trifluoromethyl)-1,3,5-triazine is readily hydrolysed by hydrochloric acid to yield trifluoroacetic acid whose sodium salt is a well-known rodenticide and insecticide. Esters of perfluoroalkyl carboxylic acids are readily obtained by reactions between tris-perfluoroalkyl triazines and the appropriate alcohol in an acid medium, and some of these yield by further reactions pharmaceuticals and textile assistants.

In the examples percentages are by weight.

EXAMPLE 1

A mixture of freshly distilled cyanuric fluoride (14 g.) caesium fluoride (2 g.) and tetrafluoroethylene (50 g.) in dry, redistilled acetonitrile (50 ml.) was heated with constant agitation in a stainless steel autoclave (150 ml.) at 80° C. for 6½ hours during which time there was a pressure drop of 110 lb./sq. inch. After cooling the liquid products were collected and fractionally distilled to remove acetonitrile. The residue was separated by preparative gas-liquid chromatography into two components identified by infra-red spectroscopy and mass spectrometry as 2 - pentafluoroethyl-4,6-difluoro-1,3,5-triazine and 2,4,6-tris(pentafluoroethyl)-1,3,5-triazine.

EXAMPLE 2

A mixture of freshly distilled cyanuric fluoride (14 g.) caesium fluoride (5.0 g.) and hexafluoropropene (45 g.) in dry, redistilled acetonitrile (50 ml.) was heated with constant agitation in a stainless steel autoclave (150 ml.) at 100° C. for 4 hours. After cooling the liquid phase was separated into two layers of which the upper was identified as acetonitrile. The lower layer was washed with water to remove acetonitrile, dried and distilled to give 2,4,6-tris(heptafluoroisopropyl)-1,3,5-triazine as a white solid (25 g. equivalent to 43% yield) having a melting point of 35° C. and a boiling point of 146° C. and identified by mass-spectrometry and nuclear magnetic resonance spectroscopy.

Found by analysis: C, 24.7%; F, 67.6%. $C_{12}F_{21}N_3$ requires: C, 24.6%; F, 68.1%.

EXAMPLE 3

A mixture of freshly distilled cyanuric fluoride (14 g.), tetraethylammonium fluoride (3 g.) and tetrafluoroethylene (80 g.) in dry, redistilled acetonitrile (50 ml.) was heated with constant agitation in a stainless steel autoclave (150 ml.) at 100° C. for 4 hours and 150° C. for 4 hours during which time there was a pressure drop of 110 p.s.i. After cooling the liquid products were collected and shown by gas-liquid chromatography to consist of recovered starting material (7.6 g., 47% conversion), 2-pentafluoroethyl-4,6-difluoro-1,3,5-triazine (0.1 g., 1% yield) and 2,4,6-tris(pentafluoroethyl)-1,3,5-triazine (0.3 g., 1.5% yield).

EXAMPLE 4

A mixture of freshly distilled cyanuric fluoride (14 g.), potassium fluoride (5 g.) and tetrafluoroethylene (80 g.) in dry, redistilled acetonitrile (50 ml.) was heated with constant agitation in a stainless steel autoclave (150 ml.) at 120° C. for 6 hours. After cooling the liquid products were distilled to remove acetonitrile and the residues were identified by gas-liquid chromatography as recovered cyanuric fluoride (10.1 g., 28% conversion), 2-pentafluoroethyl-4,6-difluoro-1,3,5-triazine (0.70 g., 10% yield) and 2,4,6 - tris(pentafluoroethyl) - 1,3,5-triazine (4.1 g., 33% yield).

EXAMPLE 5

A mixture of freshly distilled cyanuric fluoride (14 g.), potassium fluoride (6 g.) and tetrafluoroethylene (80 g.) in dry, redistilled dimethylformamide (50 ml.) was heated with constant agitation in a stainless steel autoclave (150 ml.) at 100° C. for 4 hours and 150° C. for 4 hours during which time there was a pressure drop of 140 p.s.i. The liquid products were shown by gas-liquid chromatography to consist of cyanuric fluoride (5.4 g., 61% conversion), 2-pentafluoroethyl-4,6-difluoro-1,3,5-triazine (0.5 g., 3% yield), 2,4,6-tris(pentafluoroethyl)1,3,5-triazine (1.8 g., 18% yield) and dimethylformamide.

What I claim is:

1. In a process for making perfluoroalkyl-substituted 2,4,6-trifluoro-1,3,5-triazines by replacing at least one of the three fluorine atoms in 2,4,6-trifluoro-1,3,5-triazine (cyanuric fluoride) with perfluoroalkyl groups wherein a perfluoroolefin is heated with cyanuric fluoride in the presence of a catalyst, the improvement comprising using an ionic catalyst selected from fluorides of alkali metals and of tetraalkylammonium radicals and in a polar, aprotic solvent.

2. A process as claimed in claim 1 in which the reaction temperature is from 50° to 150° C. and the reaction pressure is from atmospheric pressure to 50 atmospheres.

3. A process as claimed in claim 2 in which the reaction temperature is from 80° C. to 130° C. and the reaction pressure is from 3 to 50 atmospheres and the ionic catalyst is selected from potassium fluoride, caesium fluoride and tetraethylammonium fluoride.

4. A process as claimed in claim 3 in which the perfluoroolefin is tetrafluoroethylene.

5. A process as claimed in claim 3 in which the perfluoroolefin is hexafluoropropene.

References Cited

UNITED STATES PATENTS

| 2,603,663 | 7/1952 | Feasley et al. | 260—653.1 XR |
|---|---|---|---|
| 2,845,421 | 7/1958 | Grundmann et al. | 260—248 |
| 3,240,825 | 3/1966 | Hauptschein et al. | 260—653.1 |
| 3,283,020 | 11/1966 | Parsons | 260—653 |
| 3,308,175 | 3/1967 | Barr | 260—653.1 |

OTHER REFERENCES

Knunyants et al., Chemical Abstracts, vol. 52, col. 12754 (1958).

Patai (ed.): "The Chemistry of Alkenes," Interscience Pub., New York (1964), pp. 589–91 and 604–9.

HENRY R. JILES, Primary Examiner

JOHN M. FORD, Assistant Examiner

U.S. Cl. X.R.

260—999, 539